(12) United States Patent
Jin et al.

(10) Patent No.: US 10,136,178 B2
(45) Date of Patent: Nov. 20, 2018

(54) METHODS AND SYSTEMS FOR IDENTIFYING A RECORDING CONFLICT FOR A MEDIA PROGRAM SCHEDULED TO BE RECORDED IN THE FUTURE

(71) Applicant: Verizon Patent and Licensing Inc., Arlington, VA (US)

(72) Inventors: Zhiying Jin, Lexington, MA (US); Sandeep G. Rathi, Woburn, MA (US); Yuhui Qian, Lexington, MA (US); Samuel Thomas Scott, III, Saratoga, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 111 days.

(21) Appl. No.: 14/948,658

(22) Filed: Nov. 23, 2015

(65) Prior Publication Data

US 2017/0150204 A1    May 25, 2017

(51) Int. Cl.
*H04N 21/4335* (2011.01)
*H04N 21/4147* (2011.01)
*H04N 21/458* (2011.01)
*H04N 21/432* (2011.01)
*H04N 21/433* (2011.01)
*H04N 21/647* (2011.01)

(52) U.S. Cl.
CPC ..... *H04N 21/4335* (2013.01); *H04N 21/4147* (2013.01); *H04N 21/4334* (2013.01); *H04N 21/4583* (2013.01); *H04N 21/64753* (2013.01)

(58) Field of Classification Search
CPC .. H04N 21/4583; H04N 5/775; H04N 17/004; H04N 21/40; H04N 21/4227; H04N 21/4325; H04N 21/6168; H04N 7/173; H04N 5/765
USPC .......................... 386/292, 299; 725/100, 107
See application file for complete search history.

(56) References Cited

U.S. PATENT DOCUMENTS

| | | | | |
|---|---|---|---|---|
| 8,798,444 | B1 * | 8/2014 | Crandall ............ | H04N 21/4334 386/292 |
| 8,806,550 | B1 * | 8/2014 | Chan .................... | H04N 17/004 725/100 |
| 9,414,109 | B2 * | 8/2016 | Cheng ................ | H04N 21/4325 |
| 9,699,510 | B2 * | 7/2017 | Barton ............... | H04N 21/4583 |

(Continued)

*Primary Examiner* — Thai Q Tran
*Assistant Examiner* — Syed Y Hasan

(57) ABSTRACT

An exemplary method includes a web services provider system detecting an input command provided by a user during a scheduling session and representative of a request for a local digital video recording ("DVR") system to record a media program during a presentation time period that is subsequent to the scheduling session. During the scheduling session and in response to the input command, the web services provider system identifies a maximum number of media programs other than the media program and that are already scheduled to be concurrently recorded by the local DVR system at any given time during the presentation time period, determines whether the maximum number equals a maximum recording limitation of the local DVR system, and performs, based on the determination whether the maximum number equals the maximum recording limitation of the local DVR system, a predetermined action with respect to the media program.

20 Claims, 8 Drawing Sheets

(56) References Cited

U.S. PATENT DOCUMENTS

2009/0220216 A1* 9/2009 Marsh ................ H04L 12/6418
386/292

* cited by examiner

METHODS AND SYSTEMS FOR IDENTIFYING A RECORDING CONFLICT FOR A MEDIA PROGRAM SCHEDULED TO BE RECORDED IN THE FUTURE

BACKGROUND INFORMATION

Digital video recording ("DVR") systems allow users to record media programs (e.g., television programs, etc.) and then view or otherwise experience the recorded media programs. For example, a user may use a DVR system to schedule a recording of a particular television program, after which the DVR system may record the television program and allow the user to play back the recorded television program in a time-shifted manner.

Unfortunately, various types of limitations associated with a DVR system may result in a recording conflict for a media program scheduled to be recorded by the DVR system. The recording conflict may prevent the DVR system from being able to perform the scheduled recording of the media program without one or more other scheduled recordings being canceled and/or without one or more other already recorded media programs being deleted. For example, a maximum recording limitation of the DVR system (i.e., a maximum number of media programs that the DVR system is able to concurrently record due to hardware and/or service agreement limitations) and/or a storage space limitation may prevent the DVR system from performing a scheduled recording of a media program. Conventional DVR systems may not detect such recording conflicts until the time comes for the media program to be recorded. At that point, it may be too late for the user to take remedial action.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
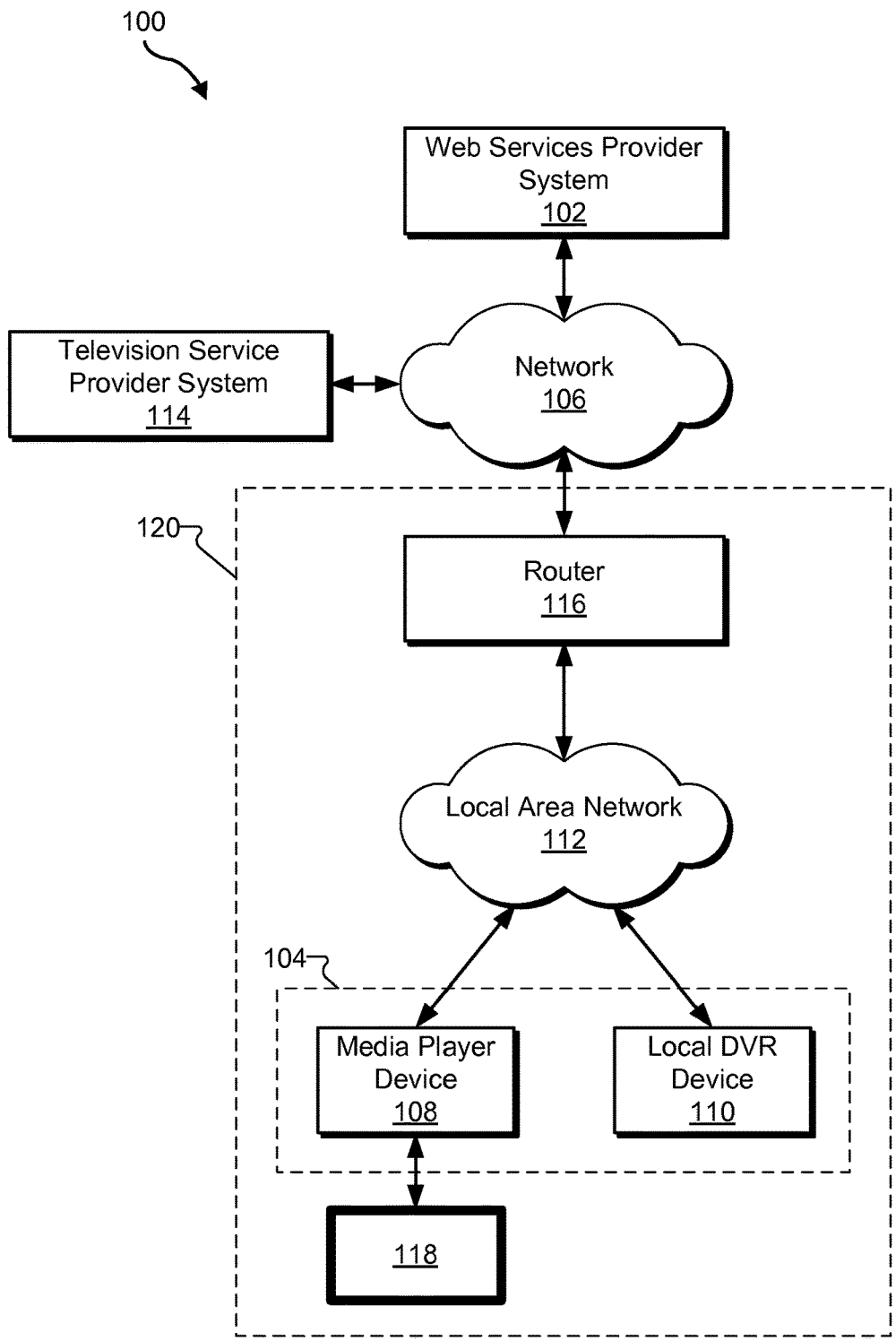
FIG. 1 shows an exemplary configuration in which a web services provider system is remote from and communicatively coupled to a local DVR system by way of a network according to principles described herein.

Methods and systems for identifying a recording conflict for a media program scheduled to be recorded in the future by a local DVR system are described herein. As will be illustrated below, a web services provider system remote from and communicatively coupled to the local DVR system by way of a network (e.g., the Internet) may be configured to manage the local DVR system. The web services provider system may detect an input command provided by a user during a scheduling session and representative of a request for the local DVR system to record a media program during a presentation time period that is subsequent to the scheduling session. During the scheduling session (e.g., within a few seconds of when the user input command is provided by the user and before the presentation time period begins), the web services provider system may identify a maximum number of media programs other than the media program and that are already scheduled to be concurrently recorded by the local DVR system at any given time during the presentation time period, determine whether the maximum number of media programs that are already scheduled to be concurrently recorded by the local DVR system at any given time during the presentation time period equals a maximum recording limitation of the local DVR system, and, based on the determination, perform a predetermined action with respect to the media program.

For example, if the web services provider system determines that the maximum number of media programs that are already scheduled to be concurrently recorded by the local DVR system at any given time during the presentation time period is equal to the maximum recording limitation of the local DVR system, the web services provider system may notify the user of a recording conflict between the media program and the media programs already scheduled to be recorded during the presentation time period, provide an option for the user to cancel a scheduled recording of one or more of the media programs already scheduled to be recorded during the presentation time period, and/or take any other suitable remedial action. Conversely, if the web services provider system determines that the maximum number of media programs that are already scheduled to be concurrently recorded by the local DVR system at any given time during the presentation time period is less than the maximum recording limitation of the local DVR system, the web services provider system may schedule the media program for recording by the local DVR system.

In some examples, as will be described in more detail below, the predetermined action performed by the web services provider system may be further based on a determination, performed by the web services provider system during the scheduling session, whether the local DVR system will have enough storage space available to record the media program during the presentation time period.

The methods and systems described herein may provide substantially real-time feedback to a user attempting to schedule a future recording of a media program by a local DVR system. This may ensure that the local DVR system will actually be able to record the media program when it comes time for the media program to be recorded (i.e., when the media program is to be presented). Moreover, the methods and systems described herein may facilitate remedial action when a recording conflict is detected (e.g., by identifying alternative times during which the media program may be recorded, alternative recording mediums, etc.).

FIG. 1 shows an exemplary configuration 100 in which a web services provider system 102 is remote from and communicatively coupled to a local DVR system 104 by way of a network 106. Local DVR system 104 may include a media player device 108 and a local DVR device 110 communicatively coupled to each other by way of a local area network 112. As shown, configuration 100 further includes a television service provider system 114, a router 116, and a display screen 118 connected to media player device 108. As shown, local DVR system 104, router 116, and display screen 118 may be located within a user premises 120 (e.g., a home, business, or other geographic area) associated with a user.

As shown, web services provider system 102 and television service provider system 114 may be communicatively coupled to network 106. Network 106 may include one or more wide area networks (e.g., the Internet), wireless communication networks, mobile telephone networks (e.g., cellular telephone networks), closed media networks, open media networks, subscriber television networks, and/or any other networks capable of carrying data (e.g., media streams) and/or communications signals. Local DVR system 104 may be connected to network 106 by way of router 116 and local area network 112 and thereby communicate with web services provider system 102 and/or television service provider system 114. Local area network 112 may include any suitable network that connects network-enabled devices within user premises 120. For example, local area network 112 may include a wired and/or wireless network provided by router 116.

Web services provider system 102, television service provider system 114, router 116, media player device 108, and local DVR device 110 may communicate using any communication platforms and technologies suitable for transporting data (e.g., media streams) and/or communication signals, including known communication technologies, devices, media, and protocols supportive of remote communications, examples of which include, but are not limited to, data transmission media, communications devices, Internet Protocol ("IP"), Transmission Control Protocol ("TCP"), User Datagram Protocol ("UDP"), Hypertext Transfer Protocol ("HTTP"), Hypertext Transfer Protocol Secure ("HTTPS"), Real-Time Transport Protocol ("RTP"), Session Initiation Protocol ("SIP"), Simple Object Access Protocol ("SOAP"), Extensible Mark-up Language ("XML") and variations thereof, radio frequency ("RF") signaling technologies, Code Division Multiple Access ("CDMA") technologies, Global System for Mobile Communications ("GSM") technologies, Time Division Multiple Access ("TDMA") technologies, Short Message Service ("SMS"), Multimedia Message Service ("MMS"), wireless communication technologies, Internet communication technologies, media streaming technologies, media download technologies, and other suitable communications technologies.

Web services provider system 102 may provide a web service that manages local DVR system 104. The web service may include any suitable network-based service capable of performing the management operations described herein. Web services provider system 102 may be associated with (e.g., maintained and/or provided by) any suitable entity (e.g., a television service provider that is also associated with television service provider system 114, a third party entity not associated with television service provider system 114, a network service provider, etc.). Exemplary components of web services provider system 102 will be described below.

Television service provider system 114 may provide a television service for access by one or more users (e.g., a user associated with user premises 120). The television service may include a subscription television service and/or any other television service that provides access to television programming. For example, television service provider system 114 may transmit media streams (e.g., Internet Protocol television ("IPTV") streams) to local DVR system 104 by way of network 106. Television service provider system 114 may be associated with (e.g., maintained and/or provided by) a television service provider and/or any other entity as may serve a particular implementation.

Web services provider system 102 and television service provider system 114 are shown in FIG. 1 to be separate systems for illustrative purposes only. It will be recognized that web services provider system 102 and television service provider system 114 may be integrated into a single system and/or associated with the same entity.

Router 116 may include any suitable network communication device that may be located within user premises 120 and that may distribute media streams provided by television service provider system 114 to media player device 108 and local DVR device 110. Router 116 may include, for example, a broadband home router configured to receive IPTV streams from television service provider system 114 via network 106 and distribute the IPTV streams to media player device 108 and local DVR device 110 via local area network 112.

Local DVR system 104 may include any type of local system configured to record and play back media programs provided by a television service. For example, local DVR system 104 may include an IPTV processing system configured to receive and record IPTV streams provided by an IPTV service.

Media player device 108 may include one or more computing devices configured to receive a media stream and present the media stream by displaying media content included in the media stream on display screen 118. For example, media player device 108 may include a set-top box device, a computer, a tablet computer, a smart phone device, a gaming console, and/or any other type of computing device capable of receiving and presenting media streams. In some examples, media player device 108 may be IP-based (i.e., media player device 108 may be configured to receive and present IPTV streams). As will be described below, a media player device 108 may not have its own DVR storage capabilities. A single media player device 108 is shown to be included in local DVR system 104 for illustrative purposes only. It will be recognized that local DVR system 104 may alternatively include a plurality of media player devices.

Display screen 118 may be configured to display media content included in media streams received and processed by media player device 108. Display screen 118 may be separate from and communicatively connected to media player device 108. For example, a display screen 118 may include a television or a computer monitor separate from and connected to a set-top box device. Alternatively, a display screen 118 may be integrated into media player device 108. For example, a display screen 118 may include a screen that is a part of a tablet computer.

Local DVR device 110 may include any suitable computing device or combination of computing devices configured to receive and record media streams received by any of the devices included in local DVR system 104. In this manner, local DVR device 110 may provide DVR functionality to media player device 108, even if media player device 108 does not have its own DVR storage capabilities. For example, a user of media player device 108 may provide a request for media player device 108 to play back a media program recorded by local DVR device 110. In response to the request, web services provider system 102 may direct local DVR device 110 to transmit a media stream that includes the recorded media program to media player device 108 for playback by media player device 108.

In some examples, local DVR system 104 (e.g., local DVR device 110) may be capable of concurrently receiving and recording a maximum number of media streams (i.e., media programs) at any given time. This maximum number may be referred to as a "maximum recording limitation" of the local DVR system 104. In some examples, the maximum recording limitation is determined by hardware capabilities of local DVR system 104 (e.g., local DVR system 104 may only have a certain number of tuners or other hardware configured to concurrently receive and record media content streams). Additionally or alternatively, the maximum recording limitation may be determined by a service agreement that governs an operation of local DVR system 104. For example, a user of local DVR system 104 may subscribe to a DVR service that specifies that local DVR system 104 may concurrently only receive and record a specified number of media streams.

Local DVR system 104 (e.g., local DVR device 110) may additionally or alternatively have a predetermined amount of storage space that may be used to store recorded media programs. This storage space limitation may be determined by hardware capabilities of local DVR system 104 (e.g., local DVR system 104 may be configured to record media programs to a hard drive or other storage medium that has a particular amount of storage space available for media program recordings). Additionally or alternatively, the storage space limitation may be determined by a service agreement that governs an operation of local DVR system 104. For example, a user of local DVR system 104 may subscribe to a DVR service that specifies that local DVR system 104 may only store a predetermined amount of data representative of recorded media programs.

Figure 2:
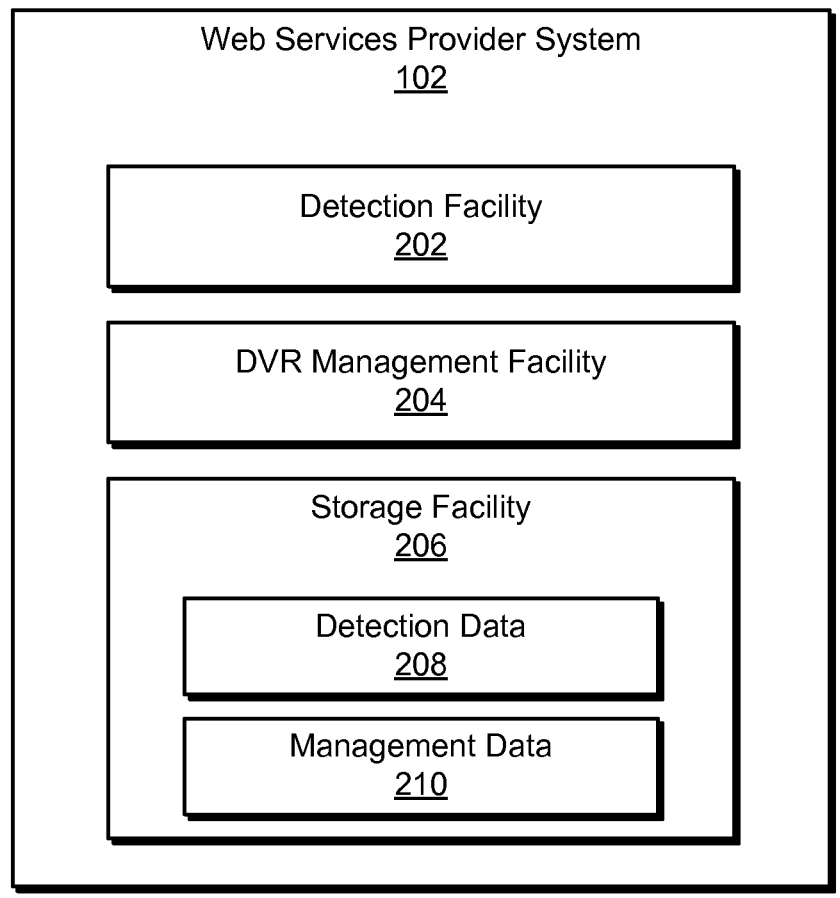
FIG. 2 illustrates various components of a web services provider system according to principles described herein.

FIG. 2 illustrates various components of web services provider system 102. As shown, web services provider system 102 may include, without limitation, a detection facility 202, a DVR management facility 204, and a storage facility 206 selectively and communicatively coupled to one another. It will be recognized that although facilities 202-206 are shown to be separate facilities in FIG. 2, any of facilities 202-206 may be combined into fewer facilities, such as into a single facility, or divided into more facilities as may serve a particular implementation. Additionally or alternatively, one or more of the facilities 202-206 may be omitted from and external to web services provider system 102 in other implementations. For example, storage facility 206 may be external of and communicatively coupled to web services provider system 102 in certain alternative implementations. Facilities 202-206 of web services provider system 102 may include or be otherwise implemented by one or more computing devices specifically configured to perform one or more of the operations described herein. In such implementations, web services provider system 102 may be referred to as a computer-implemented web services provider system 102.

Storage facility 206 may store detection data 208 generated and/or used by detection facility 202 and management data 210 generated and/or used by DVR management facility 204. Storage facility 206 may store additional or alternative data as may serve a particular implementation.

Data stored by storage facility 206 may be accessed by web services provider system 102 from any suitable source, including a source internal or external to web services provider system 102. Storage facility 206 may permanently or temporarily store data. In certain examples, web services provider system 102 may access certain data from a source external to web services provider system 102 and temporarily store the data in storage facility 206 for use by detection facility 202 and/or DVR management facility 204. In certain examples, data generated by detection facility 202 and/or DVR management facility 204 may be stored permanently or temporarily to storage facility 206.

Detection facility 202 may detect an input command provided by a user and representative of a request for a local DVR system (e.g., local DVR system 104) to perform a DVR operation with respect to a media program provided by a television service. As used herein, a "DVR operation" refers to a recording operation, a playback operation, a delete operation, and/or any other suitable operation as may serve a particular implementation. For example, the request may include a request for a local DVR device included in the local DVR system to record the media program. As another example, the request may include a request for a media player device included in the local DVR system to play back the media program.

Detection facility 202 may detect the input command provided by the user and representative of the request for the local DVR system to perform the DVR operation in any suitable manner. For example, detection facility 202 may detect the input command by receiving the input command from the media player device 108 or the local DVR device 110. To illustrate, a user may provide the input command by using a remote control device to transmit the input command to the media player device 108. The media player device 108 may relay or otherwise transmit the input command to detection facility 202 by way of local area network 112 and network 106 without performing the DVR operation represented by the input command.

As another example, detection facility 202 may detect the input command by receiving the input command directly from a remote control device and/or any other computing device not included in local DVR system 104. To illustrate, a user may provide the input command by utilizing a remote control device. The remote control device may be configured to transmit the input command directly to web services provider system 102 (e.g., by way of networks 112 and 106) while bypassing local DVR system 104. Detection facility 202 may detect the input command by receiving the input command transmitted from the remote control device. It will be recognized that the input command may alternatively be provided by an application executed by a mobile device utilized by the user, a web-based application accessed by way of a computing device, and/or any other source as may serve a particular implementation.

In some examples, detection facility 202 may detect an input command provided by a user during a scheduling session and representative of a request for the local DVR system to record a media program during a presentation time period that is subsequent to the scheduling session. In other words, the request may be for the local DVR system to record the media program at some point in the future with respect to when the input command is provided.

Figure 3:
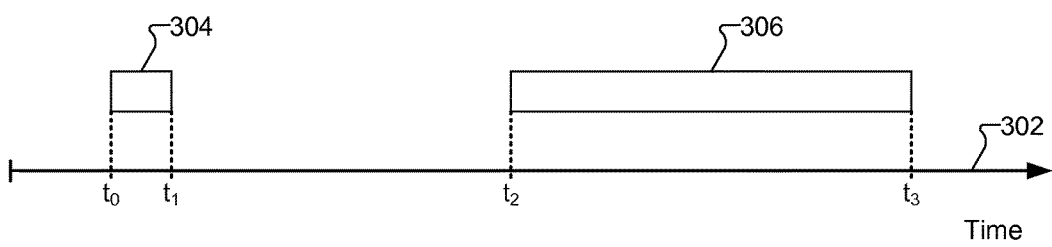
FIG. 3 shows an exemplary timeline that shows a scheduling session and a presentation time period according to principles described herein.

To illustrate, FIG. 3 shows an exemplary timeline 302 that shows a scheduling session 304 and a presentation time period 306. As shown, scheduling session 304 may begin at time $t_0$ and end at time $t_1$. Time $t_0$ represents a point in time at which the user provides the input command representative of the request for the local DVR system to record the media program. Time $t_1$ represents a point in time that is a predetermined amount of time (e.g., a few seconds) subsequent to time $t_0$.

As shown, presentation time period 306 is subsequent to (i.e., in the future with respect to) scheduling session 304 and may begin at time $t_2$ and end at time $t_3$. For example, time $t_2$ may correspond to a time at which the media program is scheduled to begin being presented by the television service and time $t_3$ may correspond to a time at which the media program is scheduled to end being presented by the television service. In some examples, time $t_2$ (i.e., the time at which presentation time period 306 begins) is temporally separated from time $t_1$ (i.e., the time at which scheduling session 304 ends) by at least one minute (e.g., by a day or more).

Returning to FIG. 2, DVR management facility 204 may perform various DVR management operations. For example, in response to detection facility 202 detecting the input command representative of the request for the local DVR system to record the media program during the presentation time period that is subsequent to the scheduling session, DVR management facility 204 may identify a maximum number of media programs other than the media program and that are already scheduled to be concurrently recorded by the local DVR system at any given time during the presentation time period. DVR management facility 204 may then determine whether the maximum number of media programs that are already scheduled to be concurrently recorded by the local DVR system at any given time during the presentation time period equals a maximum recording limitation of the local DVR system. Based on this determination, DVR management facility 204 may perform a predetermined action with respect to the media program.

The identifying, determining, and performing operations may each be performed by DVR management facility 204 during the scheduling session (as opposed to during the presentation time period) in order to provide substantially real-time feedback to the user regarding any recording conflicts that may arise as a result of the media program being scheduled for recording. Each of these operations will be described in more detail below.

DVR management facility 204 may identify a maximum number of media programs other than the media program and that are already scheduled to be concurrently recorded by the local DVR system at any given time during the presentation time period in any suitable manner. For example, DVR management facility 204 may identify a plurality of time slots included in the presentation time period. The plurality of time slots may be defined by start and stop times of the media program and a plurality of media programs already scheduled to be recorded during at least a portion of the presentation time period. DVR management facility 204 may then determine recording counts for the plurality of time slots, the recording counts each representative of a total number of media programs included in the plurality of media programs and that are scheduled to be recorded during each of the plurality of time slots. DVR management facility 204 may then identify a particular recording count included in the recording counts and that is greater than a rest of the recording counts and designate the particular recording count as the maximum number of media programs other than the media program and that are already scheduled to be concurrently recorded by the local DVR system at any given time during the presentation time period.

Figure 4:
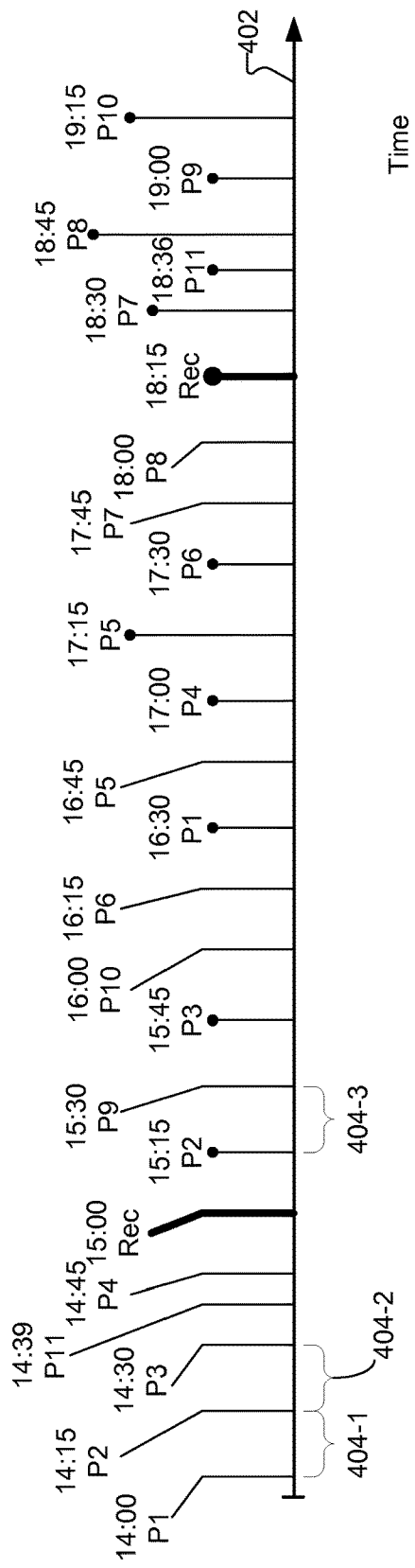
FIG. 4 shows a timeline that indicates start and stop times of a plurality of media programs scheduled to be recorded by a local DVR system according to principles described herein.

To illustrate, FIG. 4 shows a timeline 402 that indicates start and stop times of a plurality of media programs (labeled P1 through P11) scheduled to be recorded by a local DVR system. As used herein, a "start time" of a media program refers to a time at which the media program is scheduled to begin being presented and a "stop time" of a media program refers to a time at which the media program is scheduled to end being presented. As shown in FIG. 4, the start times of the media programs are represented by angled lines and the stop times of the media programs are represented by straight lines with circular endpoints. For example, the start time of P1 is 14:00 (i.e., 2:00 pm) and the stop time of P1 is 16:30 (i.e., 4:30 pm), the start time of P2 is 14:15 (i.e., 2:15 pm) and the stop time of P2 is 15:15 (i.e., 3:15 pm), etc.

As mentioned, the start and stop times of the media programs scheduled to be recorded by the local DVR system define a plurality of time slots. For example, the time slots may be defined by sequential and adjacent points in time that correspond to either start or stop times of the media programs. For example, FIG. 4 shows a first time slot 404-1 defined by the start time for P1 and the start time for P2 and a second time slot 404-2 defined by the start time for P2 and the start time for P3. As another example, time slot 404-3 shown in FIG. 4 is defined by a stop time of P2 and a start time for P9.

FIG. 4 also shows a start time (i.e., 15:00) and a stop time (i.e., 18:15) that define a presentation time period for a media program labeled "Rec" for which a user provides an input command during a scheduling session for the local DVR system to record. As shown, the presentation time periods for various media programs already scheduled for recording at least partially overlap the presentation time period of the media program labeled "Rec". To determine how many media programs are scheduled for concurrent recording at any given time during the presentation time period of the media program labeled "Rec", DVR management facility 204 may count how many media programs are scheduled for recording during each time slot that is included within the presentation time period of the media program labeled "Rec".

To illustrate, Table 1 below shows the start and end times for each time slot included within the presentation time period of the media program labeled "Rec" (i.e., each time slot between times 15:00 and 18:15). As shown, DVR management facility 204 may identify the media programs that are scheduled to be presented during each time slot (i.e., that overlap with each time slot) and generate a "recording count" for each time slot that indicates how many media programs are scheduled for recording during each time slot. For example, during the first time slot included in the presentation time period (i.e., the time slot that has a start time of 15:00 and an end time of 15:15), DVR management facility 204 may determine that five media programs are being concurrently recorded during the first time slot (i.e., media programs P1, P2, P3, P11, and P4).

TABLE 1

| Time Slot | Start Time | End Time | Overlapping Media Program IDs | Recording Count |
|---|---|---|---|---|
| 1 | 15:00 | 15:15 | P1, P2, P3, P11, P4 | 5 |
| 2 | 15:15 | 15:30 | P1, P3, P11, P4 | 4 |
| 3 | 15:30 | 15:45 | P1, P3, P11, P4, P9 | 5 |
| 4 | 15:45 | 16:00 | P1, P4, P11, P9 | 4 |
| 5 | 16:00 | 16:15 | P1, P4, P11, P9, P10 | 5 |
| 6 | 16:15 | 16:30 | P1, P4, P11, P9, P10, P6 | 6 |
| 7 | 16:30 | 16:45 | P4, P11, P9, P10, P6 | 5 |
| 8 | 16:45 | 17:00 | P4, P11 P9, P10, P6, P5 | 6 |

TABLE 1-continued

| Time Slot | Start Time | End Time | Overlapping Media Program IDs | Recording Count |
|---|---|---|---|---|
| 9 | 17:00 | 17:15 | P11, P9, P10, P6, P5 | 5 |
| 10 | 17:15 | 17:30 | P11, P9, P10, P6 | 4 |
| 11 | 17:30 | 17:45 | P11, P9, P10 | 3 |
| 12 | 17:45 | 18:00 | P11, P9, P10, P7 | 4 |
| 13 | 18:00 | 18:15 | P11, P9, P10, P7, P8 | 5 |

Once DVR management facility 204 has determined the recording count for each time slot included in the presentation time period, DVR management facility 204 may identify the highest recording count and designate the highest recording count as the maximum number of media programs that are scheduled to be concurrently recorded by the local DVR system at any given time during the presentation time period. For example, in the present example, the highest recording count is six, which occurs in both the sixth and eighth time slots listed in Table 1.

DVR management facility 204 may determine whether the maximum number of media programs that are scheduled to be concurrently recorded by the local DVR system at any given time during the presentation time period equals the maximum recording limitation of the local DVR system.

For example, continuing with the present example, if the maximum recording limitation (which may be determined by DVR management facility 204 in any suitable manner) of the local DVR system is six, DVR management facility 204 may determine that the maximum number of media programs that are scheduled to be concurrently recorded by the local DVR system at any given time during the presentation time period equals the maximum recording limitation of the local DVR system. In response, DVR management facility 204 may perform various actions. For example, DVR management facility 204 may notify the user of a recording conflict between the media program and the media programs already scheduled to be recorded during the presentation time period. DVR management facility 204 may notify the user of the recording conflict in any suitable manner. For example, DVR management facility 204 may present the user with a message by way of a display screen connected to the local DVR system. Additionally or alternatively, DVR management facility 204 may provide the user with an option for the user to cancel a scheduled recording of one or more of the media programs already scheduled to be recorded during the presentation time period.

Alternatively, if the maximum recording limitation of the local DVR system is seven, DVR management facility 204 may determine that the maximum number of media programs that are already scheduled to be concurrently recorded by the local DVR system at any given time during the presentation time period is less than the maximum recording limitation of the local DVR system. In response, DVR management facility 204 may schedule the media program labeled "Rec" for recording by the local DVR system.

In some examples, DVR management facility 204 may also determine, during the scheduling session, whether the local DVR system will have enough storage space available to record the media program during the presentation time period. The predetermined action performed by DVR management facility 204 may be further based on this determination.

DVR management facility 204 may determine whether the local DVR system will have enough storage space available to record the media program during the presentation time period in any suitable manner. For example, DVR management facility 204 may determine a first storage space amount required to record the media program, determine a second storage space amount required to record all other media programs already scheduled to be recorded by the local DVR system prior to and during the presentation time period, determine an available storage space amount for the local DVR system at a time that the input command is detected, and determine whether the available storage space amount minus the second storage space amount is equal to or greater than the first storage space amount.

To illustrate, DVR management facility 204 may determine that 5 GB of storage space will be required to record the media program, and that 50 GB of storage space will be required to record all other media programs already scheduled to be recorded by the local DVR system prior to and during the presentation time period of the media program. DVR management facility 204 may also determine that the local DVR system only has 52 GB of storage space available when the user provides the input command to record the media program. Based on this data, DVR management facility 204 may determine that the local DVR system is 3 GB short of being able to record the media program (i.e., the local DVR system does not have enough storage space to record the media program).

DVR management facility 204 may determine the first and second storage space amounts in any suitable manner. For example, DVR management facility 204 may determine the first and second storage space amounts by accessing metadata (which may be maintained by the television service provider or another entity) associated with the various media program scheduled for recording and that indicates a size of the media programs. Additionally or alternatively, DVR management facility 204 may estimate the storage space requirements based on a temporal length of each of the media programs.

DVR management facility 204 may perform various predetermined actions in response to determining that the local DVR system does not have enough storage space available to record the media program during the presentation time period. For example, DVR management facility 204 may notify the user that the local DVR system does not have enough storage space available to record the media program during the presentation time period, provide the user with an option to delete one or more media programs that have already been recorded by the DVR system, provide an option for the user to cancel a scheduled recording of one or more of the media programs already scheduled to be recorded during the presentation time period, and/or identify an alternative storage medium (e.g., a storage medium included in a different local DVR device included within the local DVR system) for the media program. Once any recording limitation and storage space-related conflicts have been resolved, DVR management facility 204 may schedule the recording of the media program.

In some examples, if multiple local DVR devices are included in a local DVR system, DVR management facility 204 may analyze recording and storage capabilities of each local DVR device in order to determine which local DVR device is to be used to record and store a particular media program.

Figure 5:
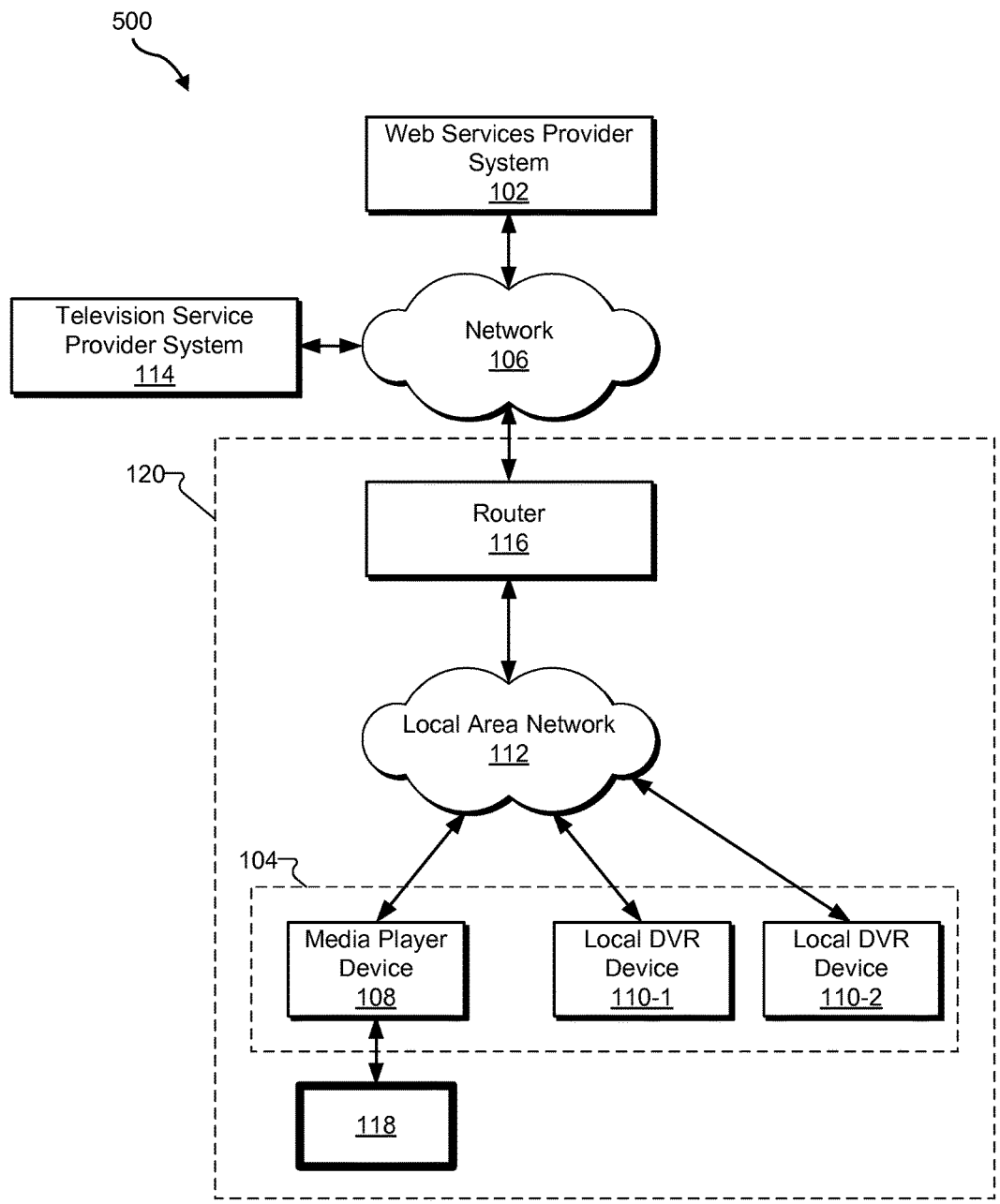
FIG. 5 shows an exemplary configuration in which a local DVR system includes multiple local DVR devices.

To illustrate, FIG. 5 shows an exemplary configuration 500 that is similar to configuration 100, except that in configuration 500, local DVR system 104 includes multiple local DVR devices (i.e., local DVR device 110-1 and local DVR device 110-2). In this configuration, in response to an input command provided by a user during a scheduling session and representative of a request for local DVR system 104 to record a media program during a presentation time period that is subsequent to the scheduling session, DVR management facility 204 may first determine whether local DVR device 110-1 is able to perform the recording.

In this example, DVR management facility 204 may determine that the maximum number of media programs that are already scheduled to be concurrently recorded by local DVR device 110-1 at any given time during the presentation time period equals a maximum recording limitation of the first DVR device 110-1. Based on this, DVR management facility 204 may determine that local DVR device 110-1 is not able to perform the recording. DVR management facility 204 may then determine whether local DVR device 110-2 is able to perform the recording. In this example, DVR management facility 204 may determine that the maximum number of media programs that are already scheduled to be concurrently recorded by local DVR device 110-2 at any given time during the presentation time period is less than a maximum recording limitation of the second DVR device 110-2. In response, DVR management facility 204 may direct the second local DVR device 110-2 to record the media program during the presentation time period.

Figure 6:
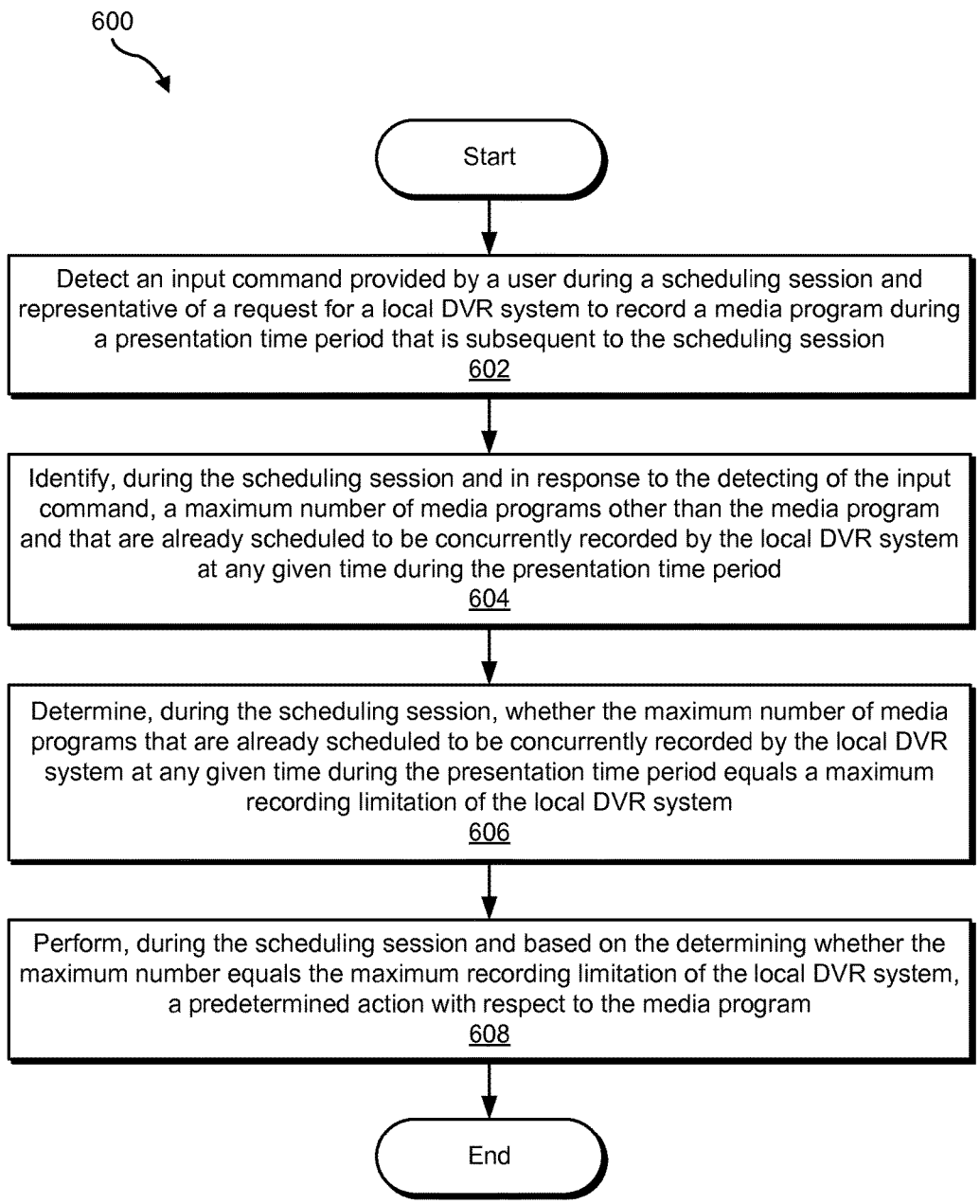
FIGS. 6-7 illustrate exemplary methods of identifying a recording conflict for a media program scheduled to be recorded in the future.

FIG. 6 illustrates an exemplary method 600 of identifying a recording conflict for a media program scheduled to be recorded in the future. While FIG. 6 illustrates exemplary operations according to one embodiment, other embodiments may omit, add to, reorder, and/or modify any of the operations shown in FIG. 6. One or more of the operations shown in FIG. 6 may be performed by web services provider system 102 and/or any implementation thereof.

In operation 602, a web services provider system detects an input command provided by a user during a scheduling session and representative of a request for a local DVR system to record a media program during a presentation time period that is subsequent to the scheduling session. As described herein, the web services provider system is remote from and communicatively coupled to the local DVR system by way of a network. Operation 602 may be performed in any of the ways described herein.

In operation 604, the web services provider system identifies, during the scheduling session and in response to the detecting of the input command, a maximum number of media programs other than the media program and that are already scheduled to be concurrently recorded by the local DVR system at any given time during the presentation time period. Operation 604 may be performed in any of the ways described herein.

In operation 606, the web services provider system determines, during the scheduling session, whether the maximum number of media programs that are already scheduled to be concurrently recorded by the local DVR system at any given time during the presentation time period equals a maximum recording limitation of the local DVR system. Operation 606 may be performed in any of the ways described herein.

In operation 608, the web services provider system performs, during the scheduling session and based on the determining whether the maximum number equals the maximum recording limitation of the local DVR system, a predetermined action with respect to the media program. Operation 608 may be performed in any of the ways described herein.

Figure 7:
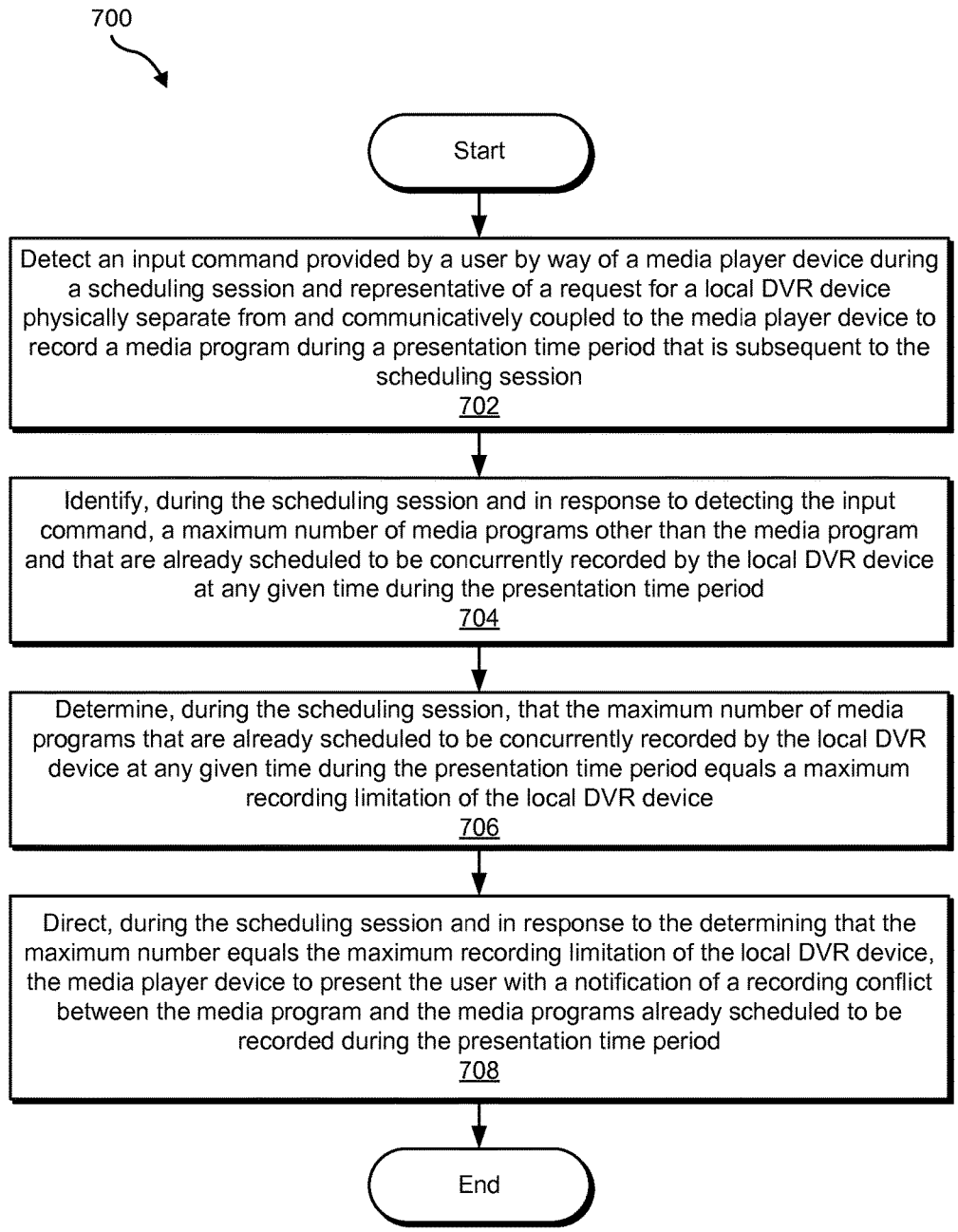

FIG. 7 illustrates another exemplary method 700 of identifying a recording conflict for a media program scheduled to be recorded in the future. While FIG. 7 illustrates exemplary operations according to one embodiment, other embodiments may omit, add to, reorder, and/or modify any of the operations shown in FIG. 7. One or more of the operations shown in FIG. 7 may be performed by web services provider system 102 and/or any implementation thereof.

In operation 702, a web services provider system detects an input command provided by a user by way of a media player device during a scheduling session and representative of a request for a local DVR device physically separate from and communicatively coupled to the media player device to record a media program during a presentation time period that is subsequent to the scheduling session. As described herein, the web services provider system is remote from and communicatively coupled to the media player device and the local DVR device by way of a network. Operation 702 may be performed in any of the ways described herein.

In operation 704, the web services provider system identifies, during the scheduling session and in response to detecting the input command, a maximum number of media programs other than the media program and that are already scheduled to be concurrently recorded by the local DVR device at any given time during the presentation time period. Operation 704 may be performed in any of the ways described herein.

In operation 706, the web services provider system determines, during the scheduling session, that the maximum number of media programs that are already scheduled to be concurrently recorded by the local DVR device at any given time during the presentation time period equals a maximum recording limitation of the local DVR device. Operation 706 may be performed in any of the ways described herein.

In operation 708, the web services provider system directs, during the scheduling session and in response to the determining that the maximum number equals the maximum recording limitation of the local DVR device, the media player device to present the user with a notification of a recording conflict between the media program and the media programs already scheduled to be recorded during the presentation time period. Operation 708 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 8:
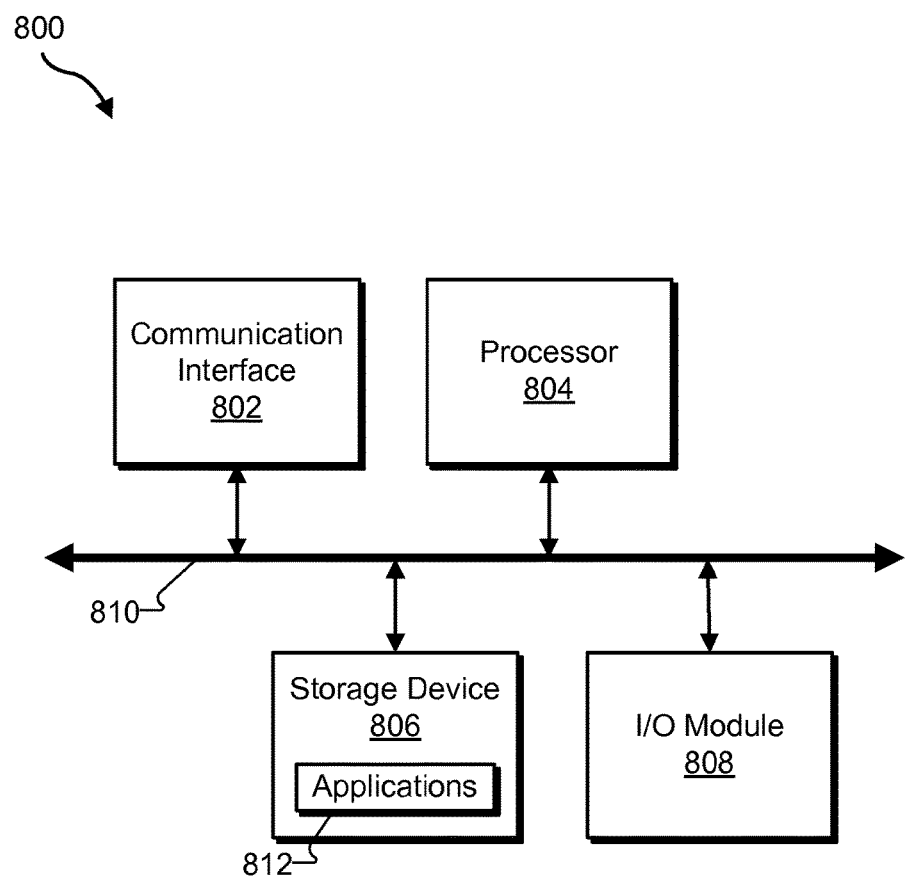
FIG. 8 illustrates an exemplary computing device according to principles described herein.

FIG. 8 illustrates an exemplary computing device 800 that may be specifically configured to perform one or more of the processes described herein. As shown in FIG. 8, computing device 800 may include a communication interface 802, a processor 804, a storage device 806, and an input/output ("I/O") module 808 communicatively connected via a communication infrastructure 810. While an exemplary computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, an audio/video connection, and any other suitable interface.

Processor 804 generally represents any type or form of processing unit capable of processing data or interpreting, executing, and/or directing execution of one or more of the instructions, processes, and/or operations described herein. Processor 804 may direct execution of operations in accordance with one or more applications 812 or other computer-executable instructions such as may be stored in storage device 806 or another computer-readable medium.

Storage device 806 may include one or more data storage media, devices, or configurations and may employ any type, form, and combination of data storage media and/or device. For example, storage device 806 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 806. For example, data representative of one or more executable applications 812 configured to direct processor 804 to perform any of the operations described herein may be stored within storage device 806. In some examples, data may be arranged in one or more databases residing within storage device 806.

I/O module 808 may be configured to receive user input and provide user output and may include any hardware, firmware, software, or combination thereof supportive of input and output capabilities. For example, I/O module 808 may include hardware and/or software for capturing user input, including, but not limited to, a keyboard or keypad, a touch screen component (e.g., touch screen display), a receiver (e.g., an RF or infrared receiver), and/or one or more input buttons.

I/O module 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 800. For example, one or more applications 812 residing within storage device 806 may be configured to direct processor 804 to perform one or more processes or functions associated with detection facility 202 and DVR management facility 204. Likewise, storage facility 206 may be implemented by or within storage device 806.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

detecting, by a web services provider system remote from and communicatively coupled to a local digital video recording ("DVR") system by way of a network, an input command provided by a user during a scheduling session and representative of a request for the local DVR system to record a media program during a presentation time period that is subsequent to the scheduling session, the detecting of the input command comprising receiving the input command from the local DVR system by way of the network;

identifying, by the web services provider system during the scheduling session and in response to the detecting of the input command, a maximum number of media programs other than the media program and that are already scheduled to be concurrently recorded by the local DVR system at any given time during the presentation time period by
  identifying a plurality of time slots included in the presentation time period, the plurality of time slots defined by start and stop times of the media program and a plurality of media programs already scheduled to be recorded by the local DVR system during at least a portion of the presentation time period,
  determining recording counts for the plurality of time slots, the recording counts each representative of a total number of media programs included in the plurality of media programs and that are scheduled to be recorded during each of the plurality of time slots,
  identifying a particular recording count included in the recording counts and that is greater than a rest of the recording counts, and
  designating the particular recording count as the maximum number;
determining, by the web services provider system during the scheduling session, whether the maximum number of media programs that are already scheduled to be concurrently recorded by the local DVR system at any given time during the presentation time period equals a maximum recording limitation of the local DVR system; and
performing, by the web services provider system during the scheduling session and based on the determining whether the maximum number equals the maximum recording limitation of the local DVR system, a predetermined action with respect to the media program.

2. The method of claim 1, wherein:
the determining comprises determining that the maximum number of media programs that are already scheduled to be concurrently recorded by the local DVR system at any given time during the presentation time period is equal to the maximum recording limitation of the local DVR system; and
the performing of the predetermined action comprises notifying the user of a recording conflict between the media program and the media programs already scheduled to be recorded during the presentation time period.

3. The method of claim 1, wherein:
the determining comprises determining that the maximum number of media programs that are already scheduled to be concurrently recorded by the local DVR system at any given time during the presentation time period is equal to the maximum recording limitation of the local DVR system; and
the performing of the predetermined action comprises providing an option for the user to cancel a scheduled recording of one or more of the media programs already scheduled to be recorded during the presentation time period.

4. The method of claim 1, wherein:
the determining comprises determining that the maximum number of media programs that are already scheduled to be concurrently recorded by the local DVR system at any given time during the presentation time period is less than the maximum recording limitation of the local DVR system; and
the performing of the predetermined action comprises scheduling the media program for recording by the local DVR system.

5. The method of claim 1, further comprising:
determining, by the web services provider system during the scheduling session, whether the local DVR system will have enough storage space available to record the media program during the presentation time period;
wherein the performing of the predetermined action is further based on the determining whether the local DVR system will have enough storage space available to record the media program during the presentation time period.

6. The method of claim 5, wherein:
the determining of whether the local DVR system will have enough storage space comprises determining that the local DVR system does not have enough storage space available to record the media program during the presentation time period; and
the performing of the predetermined action comprises at least one of:
  notifying the user that the local DVR system does not have enough storage space available to record the media program during the presentation time period,
  providing the user with an option to delete one or more media programs that have already been recorded by the local DVR system,
  providing an option for the user to cancel a scheduled recording of one or more of the media programs already scheduled to be recorded during the presentation time period, and
  identifying an alternative storage medium for the media program.

7. The method of claim 5, wherein the determining of whether the local DVR system will have enough storage space comprises:
  determining a first storage space amount required to record the media program;
  determining a second storage space amount required to record all other media programs already scheduled to be recorded by the local DVR system prior to and during the presentation time period;
  determining an available storage space amount at a time that the input command is detected; and
  determining whether the available storage space amount minus the second storage space amount is equal to or greater than the first storage space amount.

8. The method of claim 1, wherein the maximum recording limitation of the local DVR system is a maximum number of media programs that hardware of the local DVR system is capable of concurrently recording.

9. The method of claim 1, wherein the maximum recording limitation of the local DVR system is a maximum number of media programs that the local DVR system is allowed to concurrently record in accordance with a service agreement that governs an operation of the local DVR system.

10. The method of claim 1, wherein:
the local DVR system comprises a media player device and a local DVR device separate from and communicatively coupled to the media player device;
the input command is provided by way of the media player device; and
the local DVR device is configured to perform the recording of the media program and has the maximum recording limitation.

11. The method of claim 1, wherein:
the local DVR system comprises a first local DVR device and a second local DVR device;
the determining comprises determining that a maximum number of media programs that are already scheduled to be concurrently recorded by the first local DVR device at any given time during the presentation time period equals a maximum recording limitation of the first local DVR device; and the performing of the predetermined action comprises determining that a maximum number of media programs that are already scheduled to be concurrently recorded by the second local DVR device at any given time during the presentation time period does not equal a maximum recording limitation of the second local DVR device, and directing, based on the determining that the maximum number of media programs that are already scheduled to be concurrently recorded by the second local DVR system at any given time during the presentation time period does not equal a maximum recording limitation of the second local DVR device, the second local DVR device to record the media program during the presentation time period.

12. The method of claim 1, embodied as computer-executable instructions on at least one non-transitory computer-readable medium.

13. A method comprising:

detecting, by a web services provider system, an input command provided by a user by way of a media player device during a scheduling session and representative of a request for a local digital video recording ("DVR") device physically separate from and communicatively coupled to the media player device to record a media program during a presentation time period that is subsequent to the scheduling session, the web services provider system remote from and communicatively coupled to the media player device and the local DVR device by way of a network, the detecting of the input command comprising receiving the input command from the local DVR system by way of the network;

identifying, by the web services provider system during the scheduling session and in response to detecting of the input command, a maximum number of media programs other than the media program and that are already scheduled to be concurrently recorded by the local DVR device at any given time during the presentation time period by identifying a plurality of time slots included in the presentation time period, the plurality of time slots defined by start and stop times of the media program and a plurality of media programs already scheduled to be recorded by the local DVR system during at least a portion of the presentation time period, determining recording counts for the plurality of time slots, the recording counts each representative of a total number of media programs included in the plurality of media programs and that are scheduled to be recorded during each of the plurality of time slots, identifying a particular recording count included in the recording counts and that is greater than a rest of the recording counts, and designating the particular recording count as the maximum number;

determining, by the web services provider system during the scheduling session, that the maximum number of media programs that are already scheduled to be concurrently recorded by the local DVR device at any given time during the presentation time period equals a maximum recording limitation of the local DVR device; and directing, by the services provider system during the scheduling session and in response to the determining that the maximum number equals the maximum recording limitation of the local DVR device, the media player device to present the user with a notification of a recording conflict between the media program and the media programs already scheduled to be recorded during the presentation time period.

14. The method of claim 13, embodied as computer-executable instructions on at least one non-transitory computer-readable medium.

15. A system comprising:

at least one physical computing device remote from and communicatively coupled to a local digital video recording ("DVR") system by way of a network and that comprises:

a processor;

a detection facility that directs the processor to detect an input command provided by a user during a scheduling session and representative of a request for the local DVR system to record a media program during a presentation time period that is subsequent to the scheduling session, the detection of the input command comprising receiving the input command from the local DVR system by way of the network; and a DVR management facility that directs the processor to identify, during the scheduling session and in response to the detection of the input command, a maximum number of media programs other than the media program and that are already scheduled to be concurrently recorded by the local DVR system at any given time during the presentation time period by identifying a plurality of time slots included in the presentation time period, the plurality of time slots defined by start and stop times of the media program and a plurality of media programs already scheduled to be recorded by the local DVR system during at least a portion of the presentation time period, determining recording counts for the plurality of time slots, the recording counts each representative of a total number of media programs included in the plurality of media programs and that are scheduled to be recorded during each of the plurality of time slots, identifying a particular recording count included in the recording counts and that is greater than a rest of the recording counts, and designating the particular recording count as the maximum number;

determine, during the scheduling session, whether the maximum number of media programs that are already scheduled to be concurrently recorded by the local DVR system at any given time during the presentation time period equals a maximum recording limitation of the local DVR system; and perform, during the scheduling session and based on the determination whether the maximum number equals the maximum recording limitation of the local DVR system, a predetermined action with respect to the media program.

16. The system of claim 15, wherein the at least one physical computing device:

determines that the maximum number of media programs that are already scheduled to be concurrently recorded by the local DVR system at any given time during the presentation time period is equal to the maximum recording limitation of the local DVR system; and performs the predetermined action by notifying the user of a recording conflict between the media program and the media programs already scheduled to be recorded during the presentation time period.

17. The system of claim 15, wherein the at least one physical computing device:

determines that the maximum number of media programs that are already scheduled to be concurrently recorded by the local DVR system at any given time during the presentation time period is equal to the maximum recording limitation of the local DVR system; and performs the predetermined action by providing an option for the user to cancel a scheduled recording of one or more of the media programs already scheduled to be recorded during the presentation time period.

18. The system of claim 15, wherein the at least one physical computing device:

determines that the maximum number of media programs that are already scheduled to be concurrently recorded by the local DVR system at any given time during the presentation time period is less than the maximum recording limitation of the local DVR system; and performs the predetermined action by scheduling the media program for recording by the local DVR system.

19. The system of claim 15, wherein:

the at least one physical computing device determines, during the scheduling session, whether the local DVR system will have enough storage space available to record the media program during the presentation time period; and the performance of the predetermined action is further based on the determining whether the local DVR system will have enough storage space available to record the media program during the presentation time period.

20. The system of claim 19, wherein:

the at least one physical computing device determines that the local DVR system does not have enough storage space available to record the media program during the presentation time period; and performs the predetermined action by performing at least one of:

notifying the user that the local DVR system does not have enough storage space available to record the media program during the presentation time period, providing the user with an option to delete one or more media programs that have already been recorded by the local DVR system, providing an option for the user to cancel a scheduled recording of one or more of the media programs already scheduled to be recorded during the presentation time period, and identifying an alternative storage medium for the media program.

* * * * *